United States Patent
Thompson

(10) Patent No.: US 9,796,468 B2
(45) Date of Patent: Oct. 24, 2017

(54) AIRCRAFT LANDING GEAR

(71) Applicant: Airbus Operations Limited, Bristol (GB)

(72) Inventor: Robert Ian Thompson, Bristol (GB)

(73) Assignee: Airbus Operations Limited, Bristol (GB)

( * ) Notice: Subject to any disclaimer, the term of this patent is extended or adjusted under 35 U.S.C. 154(b) by 9 days.

(21) Appl. No.: 14/800,091

(22) Filed: Jul. 15, 2015

(65) Prior Publication Data
US 2016/0023750 A1   Jan. 28, 2016

(30) Foreign Application Priority Data

Jul. 24, 2014  (GB) .................................. 1413133.8

(51) Int. Cl.
| | | |
|---|---|---|
| *B64C 25/20* | (2006.01) | |
| *B64C 25/62* | (2006.01) | |
| *B64C 25/14* | (2006.01) | |
| *B64C 25/18* | (2006.01) | |
| *B64C 25/58* | (2006.01) | |

(52) U.S. Cl.
CPC .............. *B64C 25/20* (2013.01); *B64C 25/14* (2013.01); *B64C 25/18* (2013.01); *B64C 25/58* (2013.01); *B64C 25/62* (2013.01)

(58) Field of Classification Search
CPC ......... B64C 25/20; B64C 25/58; B64C 25/62; B64C 25/64
See application file for complete search history.

(56) References Cited

U.S. PATENT DOCUMENTS 1,332,764 A * 3/1920 Schneider ............... B64C 25/62
                                                      244/104 R
1,600,154 A * 9/1926 Van Vliet ................ B64C 25/34
                                                      114/283
(Continued)

FOREIGN PATENT DOCUMENTS

EP          0 262 591          4/1988
EP          0 533 531          3/1993
(Continued)

OTHER PUBLICATIONS

European Search Reported cited in EP 15 17 7268, dated Nov. 18, 2015, eight pages.

*Primary Examiner* — Joseph W Sanderson
(74) *Attorney, Agent, or Firm* — Nixon & Vanderhye P.C.

(57) ABSTRACT

An aircraft landing gear including: a sprung arm mounted to a main pivot and carrying one or more wheels; leaf springs; a transfer arm attached to each of the leaf springs; and a swinging link with a first end which is pivotally coupled to the sprung arm via a first swinging link pivot and a second end which is pivotally coupled to the transfer arm via a second swinging link pivot. The leaf springs are arranged to provide a resilient biasing force via the transfer arm and the swinging link which opposes rotation of the sprung arm about the main pivot. Each leaf spring only absorbs a portion of the landing loads, so load and stress levels in each individual spring are lower. The swinging link enables the leaf springs to be positioned remotely from the sprung arm, in a suitable position to optimize the use of space and distribute loads efficiently into the airframe.

16 Claims, 14 Drawing Sheets

(56) References Cited

U.S. PATENT DOCUMENTS

| | | | | |
|---|---|---|---|---|
| 2,445,295 A * | 7/1948 | Pond | ................ | B60G 11/04 |
| | | | | 267/271 |
| 2,479,976 A * | 8/1949 | Shultz | ................ | B64C 25/06 |
| | | | | 244/104 LS |
| 3,332,276 A * | 7/1967 | Clarke | ................ | B64C 25/06 |
| | | | | 73/146 |
| 3,345,019 A * | 10/1967 | Black | ................ | B64C 25/62 |
| | | | | 244/100 R |
| 4,770,372 A * | 9/1988 | Ralph | ................ | B64C 25/60 |
| | | | | 244/102 R |
| 5,356,162 A * | 10/1994 | Derrien | ............ | B60G 11/04 |
| | | | | 267/227 |
| 8,640,988 B2 | 2/2014 | Thompson | | |
| 2011/0031348 A1* | 2/2011 | Thompson | ........... | B64C 25/12 |
| | | | | 244/102 R |

FOREIGN PATENT DOCUMENTS

| | | |
|---|---|---|
| FR | 416 628 | 10/1910 |
| GB | 2 271 747 | 4/1994 |
| WO | 2009/109771 | 9/2009 |

\* cited by examiner

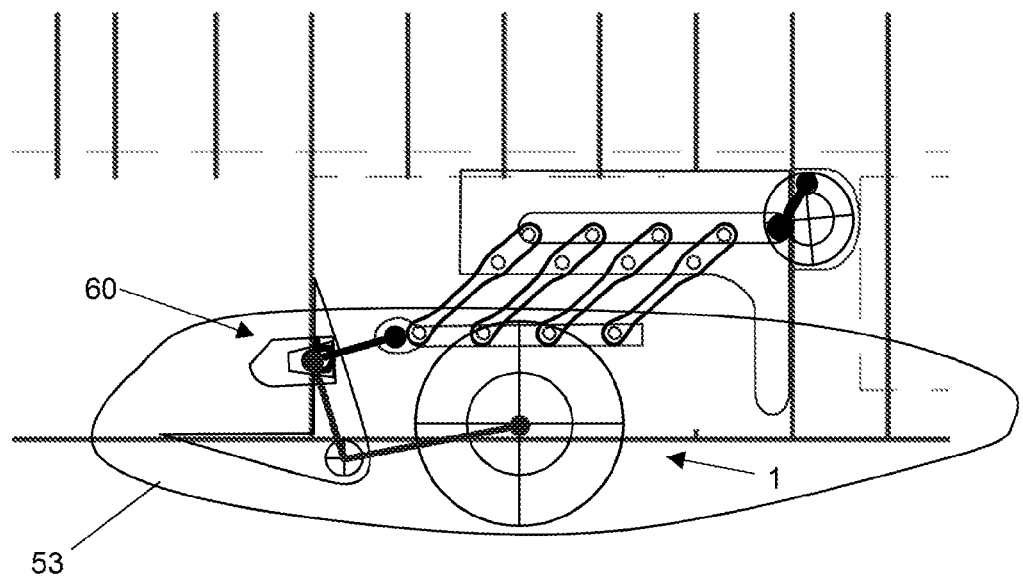

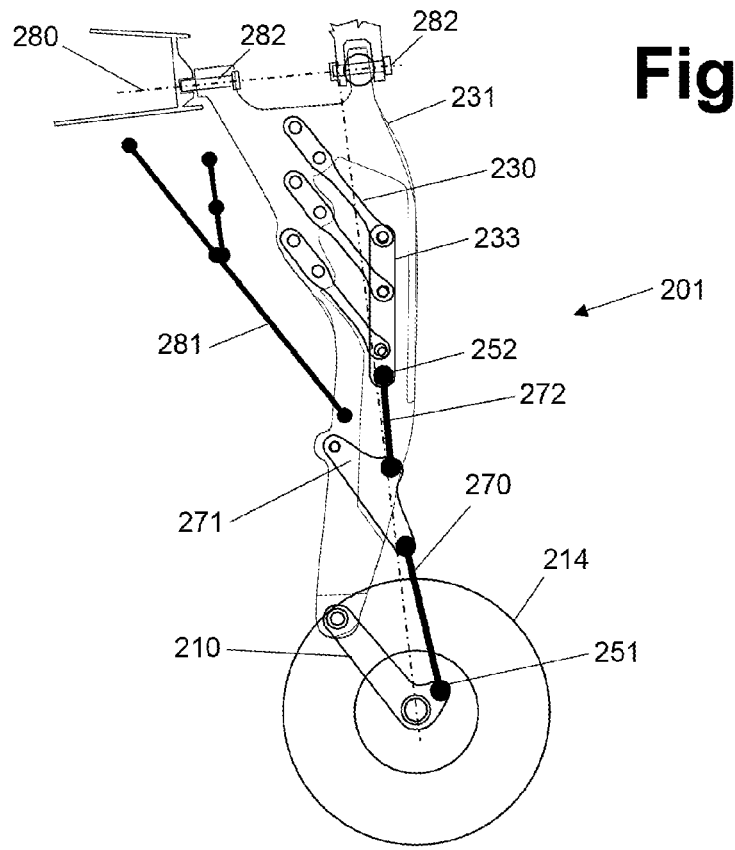
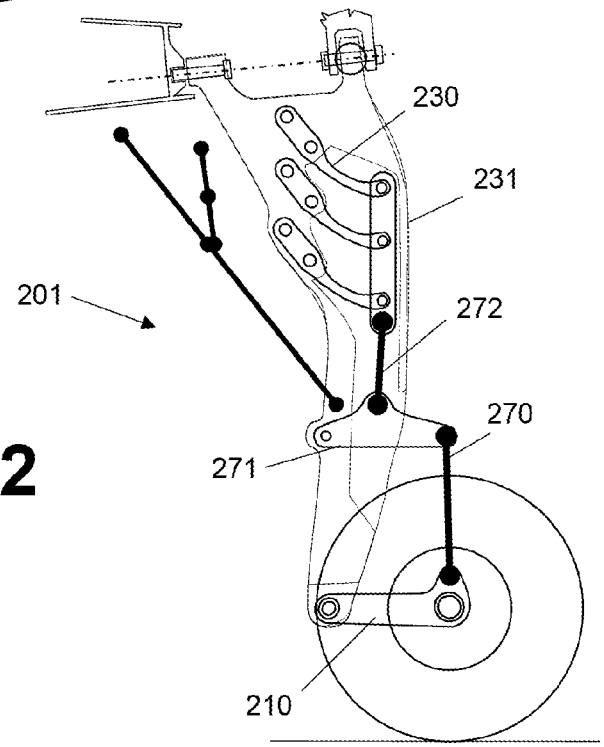

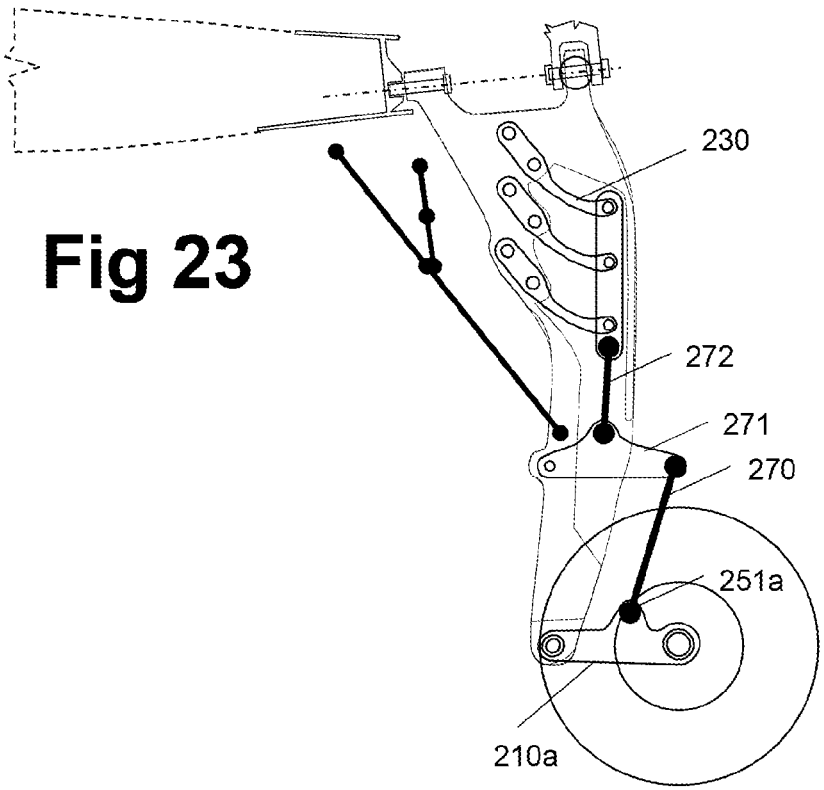
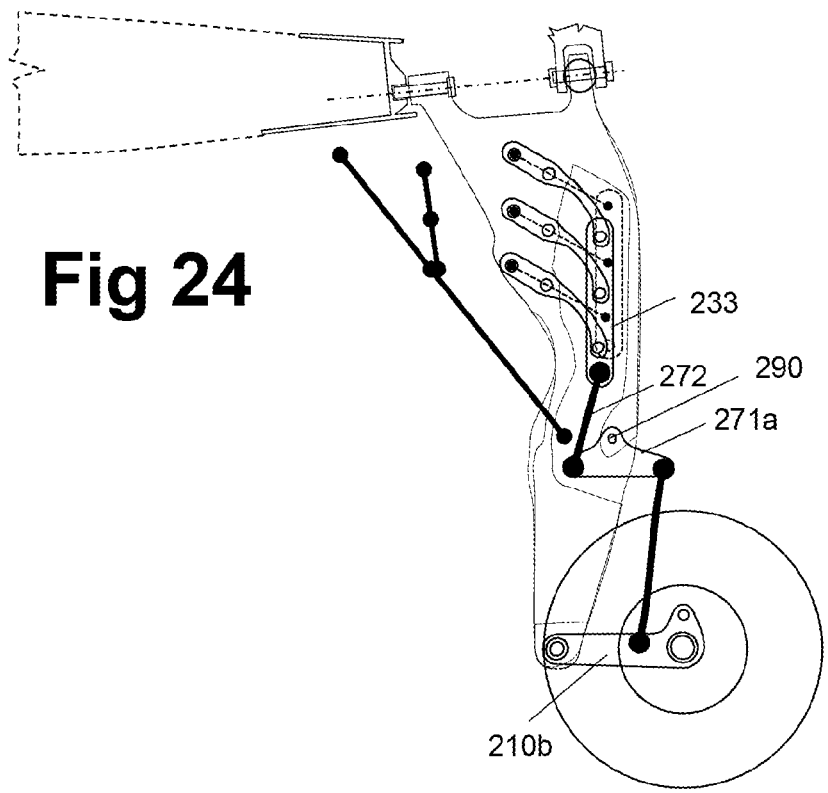

AIRCRAFT LANDING GEAR

RELATED APPLICATION

This application claims priority of United Kingdom (GB) Application Number 1413133.8 filed on 24 Jul. 2014, the entirety of which is incorporated by reference.

FIELD OF THE INVENTION

The present invention relates to a landing gear with a leaf spring for absorbing ground load.

BACKGROUND OF THE INVENTION

A landing gear with a composite leaf spring is described in U.S. Pat. No. 8,640,988. The landing gear comprises an arm mounted to a pivot and carrying one or more wheel assemblies; and a composite leaf spring which is coupled to the arm and arranged to provide a resilient biasing force which opposes rotation of the arm about the pivot. A support carries the pivot, and a proximal end of the leaf spring is coupled to the support via a swinging link which reduces tensile forces in the spring.

It may be difficult to design a leaf spring that is capable of supporting ground load for a large aircraft.

SUMMARY OF THE INVENTION

A first aspect of the invention provides an aircraft landing gear comprising: a sprung arm mounted to a main pivot and carrying one or more wheels or skids; a plurality of leaf springs; a transfer arm attached to each of the leaf springs; and a swinging link with a first end which is pivotally coupled to the sprung arm via a first swinging link pivot and a second end which is pivotally coupled to the transfer arm via a second swinging link pivot, wherein the leaf springs are arranged to provide a resilient biasing force via the transfer arm and the swinging link which opposes rotation of the sprung arm about the main pivot.

The present invention provides a plurality of leaf springs, rather than a single leaf spring as in U.S. Pat. No. 8,640,988. Thus each leaf spring only absorbs a portion of the landing loads, so load and stress levels in each individual spring are lower. A swinging link is provided between the transfer arm and the sprung arm, coupled to a distal end of each leaf spring via the transfer arm. The swinging link enables the leaf springs to be positioned remotely from the sprung arm, in a suitable position to optimise the use of space and distribute loads efficiently into the airframe.

The first end of the swinging link may be directly coupled to the sprung arm, in a similar manner to the leaf spring in FIG. 5 of U.S. Pat. No. 8,640,988. Alternatively the landing gear further comprises a crank arm which is coupled to the sprung arm so that it rotates along with the sprung arm about the pivot, and the first end of the swinging link is pivotally coupled to the sprung arm via the crank arm. Thus rather than being directly coupled to the sprung arm, the swinging link is indirectly coupled to the sprung arm via the crank arm. The use of a crank arm enables the swinging link to be positioned remotely from the sprung arm, in a suitable position to optimise the use of space. Also the length of the crank arm relative to the sprung arm can be selected to give a chosen amount of mechanical advantage.

The crank arm may extend away from the main pivot in line with the sprung arm, but more preferably the crank arm extends away from the main pivot at an angle to the sprung arm, so that the sprung arm and the crank arm together form a bell crank. This enables the speed and direction of motion of the first swinging link pivot to be optimised by selecting an appropriate length and angle for the crank arm.

A stop may be provided, which is contacted by the transfer arm when the sprung arm has rotated about the pivot to a desired position (typically a fully extended position), thereby preventing further rotation of the sprung arm about the pivot beyond the desired position.

The landing gear may be non-retractable, but more preferably it further comprises a retraction actuator arranged to retract the sprung arm by rotating it about the main pivot. Alternatively the landing gear may be retracted by moving the main pivot without rotating the sprung arm.

The retraction actuator may apply retraction force directly to the sprung arm, bypassing the leaf springs, in order to retract the sprung arm. However, more preferably the retraction actuator is arranged to apply a retraction force to the sprung arm via the leaf springs and the swinging link which causes the sprung arm to retract by rotating about the main pivot, and the leaf springs and swinging link are arranged to rotate as they apply the retraction force to the sprung arm.

The leaf springs may be rigidly coupled to the transfer arm, but more preferably each leaf spring has a distal end which is pivotally coupled to the transfer arm via a distal pivot.

The landing gear may have only two leaf springs, or three or more leaf springs with distal pivots which are not arranged in a straight line. However, more preferably there are three or more leaf springs each pivotally coupled to the transfer arm via a respective distal pivot, wherein the three or more distal pivots are arranged in a straight line.

In a preferred embodiment the landing gear comprises a leaf spring support, wherein each leaf spring has a proximal end which is pivotally coupled to the leaf spring support via a proximal pivot; a plurality of leaf spring crank arms each of which is coupled to a respective one of the leaf springs so that it rotates along with the leaf spring about the proximal pivot; an actuation arm pivotally coupled to the leaf spring crank arms; and a retraction actuator arranged to move the actuation arm thereby causing the leaf springs to rotate about their respective proximal pivots and the sprung arm to retract by rotating about the main pivot.

Optionally an uplock mechanism is arranged to prevent the sprung arm from moving after it has been fully retracted by the retraction actuator. The uplock mechanism may contact the crank arm, the sprung arm, or any other suitable part of the landing gear mechanism to prevent the sprung arm from moving.

The use of multiple leaf springs enables them to be arranged to provide optimal use of space, low drag, and efficient coupling of loads into the airframe. By way of example the leaf springs may be arranged in a leaf spring plane.

Optionally the proximal and/or distal pivots are normal to the leaf spring plane.

Optionally the leaf springs remain in the leaf spring plane as they bend to provide the resilient biasing force. This provides a more compact arrangement than if the leaf springs bend out of the leaf spring plane.

In some embodiments the swinging link comprises a single-part swinging link member which is rigid and extends between the first and second swinging link pivots. Alternatively the swinging link may be formed from two, three or more pivotally connected link members. For instance in some embodiments the main pivot is the mounting point for the sprung arm to a support, and the swinging link comprises a pair of outer links joined by an intermediate link which is pivotally attached to the support and to the pair of outer links. The intermediate link may be an idler link or bellcrank for example.

The sprung arm may be angled forward relative to a direction of motion of the aircraft, but more typically it is a trailing arm which is angled aft relative to a direction of motion of the aircraft.

The sprung arm may carry one or more skids (for instance for a helicopter) or one or more wheels (for instance for a fixed wing aircraft).

BRIEF DESCRIPTION OF THE DRAWINGS

Embodiments of the invention will now be described with reference to the accompanying drawings, in which:

FIGS. 3 to 7 show various stages of a retraction sequence;

FIG. 8b is an enlarged view of the landing gear shown in FIG. 8a;

FIG. 21 is a side view of a wing-mounted landing gear with a three-part swinging link;

FIG. 22 is a side view of the landing gear of FIG. 21 showing the sprung arm deflected due to landing load;

FIG. 23 is a side view of a first variant of the landing gear of FIG. 21;

FIG. 24 is a side view of a second variant of the landing gear of FIG. 21; and

DETAILED DESCRIPTION OF EMBODIMENT(S)

Figure 1:
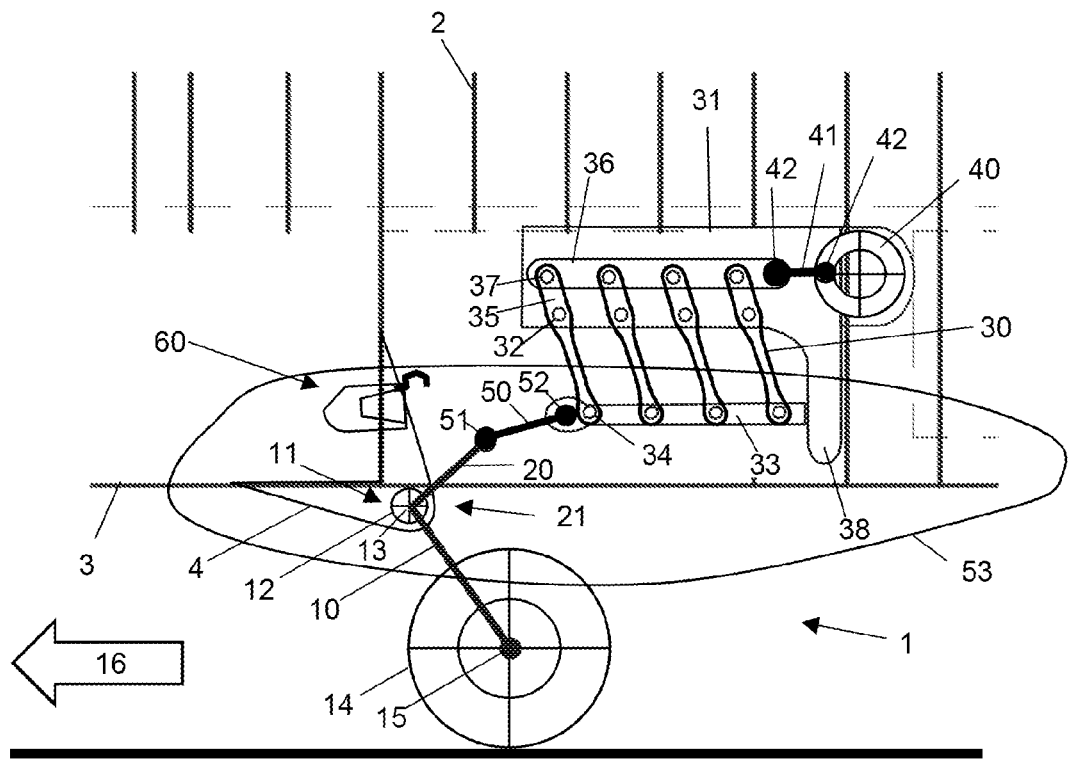
FIG. 1 is a side view of a fuselage-mounted aircraft landing gear.

FIG. 1 is a schematic side view of an aircraft landing gear 1 mounted to the fuselage of an aircraft. The fuselage comprises a series of hooped ribs 2 which are spaced apart fore and aft and carry a fuselage skin 3 and a mounting bracket 4. A sprung arm 10 is mounted to the mounting bracket 4 by a main pivot 11. The main pivot 11 comprises a main pivot shaft 12 which can rotate about a main pivot axis 13 which extends normal to the plane of FIG. 1. The sprung arm 10 carries a pair of wheels 14 (only one wheel being visible in FIG. 1) each having a wheel axis 15 which, like the main pivot axis 13, extends normal to the plane of FIG. 1. The sprung arm 10 is a trailing arm which is angled to the rear relative to a direction of motion 16 of the aircraft so that when the aircraft touches down, the ground loads cause the sprung arm 10 to rotate up about the main pivot axis 13 (anti-clockwise from the viewing direction of FIG. 1).

A crank arm 20 is also carried by the main pivot shaft 12. Thus the crank arm 20 is coupled to the sprung arm 10 by the shaft 12 so that it rotates along with the sprung arm about the main pivot 11. The included angle 21 between the crank arm 20 and the sprung arm 10 is about 95 degrees, so that the sprung arm 10 and crank arm 20 together form a bell crank. This angle could vary from the angle shown, and in fact could be 180 degrees.

Four leaf springs 30 are provided to absorb the ground loads of the aircraft as it lands. The ribs 2 carry a leaf spring support 31, and each leaf spring 30 has a proximal end which is pivotally coupled to the leaf spring support 31 via a respective proximal pivot 32, and a distal end which is pivotally coupled to a transfer arm 33 via a respective distal pivot 34. Each leaf spring 30 is coupled to a respective leaf spring crank arm 35 which extends on an opposite side of the proximal pivot 32 so that it rotates along with the leaf spring 30 about the proximal pivot 32. An actuation arm 36 is coupled to the leaf spring crank arms 35 by pivots 37.

A rotary retraction actuator 40 is coupled to the actuation arm 36 via an actuator crank 41 which is pivotally attached to the actuator 40 and the actuation arm 36 at either end by pivots 42. In the locked down position of FIG. 1, the pivots 37 and 42 are co-linear and the actuator 40 is locked in place, preventing any motion of the actuation arm 36.

The sprung arm 10 and the transfer arm 33 are coupled to each other by a swinging link arm 50 with a first end which is pivotally coupled to the sprung arm 10 via the crank arm 20 and a first swinging link pivot 51, and a second end which is pivotally coupled to the transfer arm 33 via a second swinging link pivot 52. The swinging link arm 50 is rigid between the pivots 51, 52.

Figure 2:
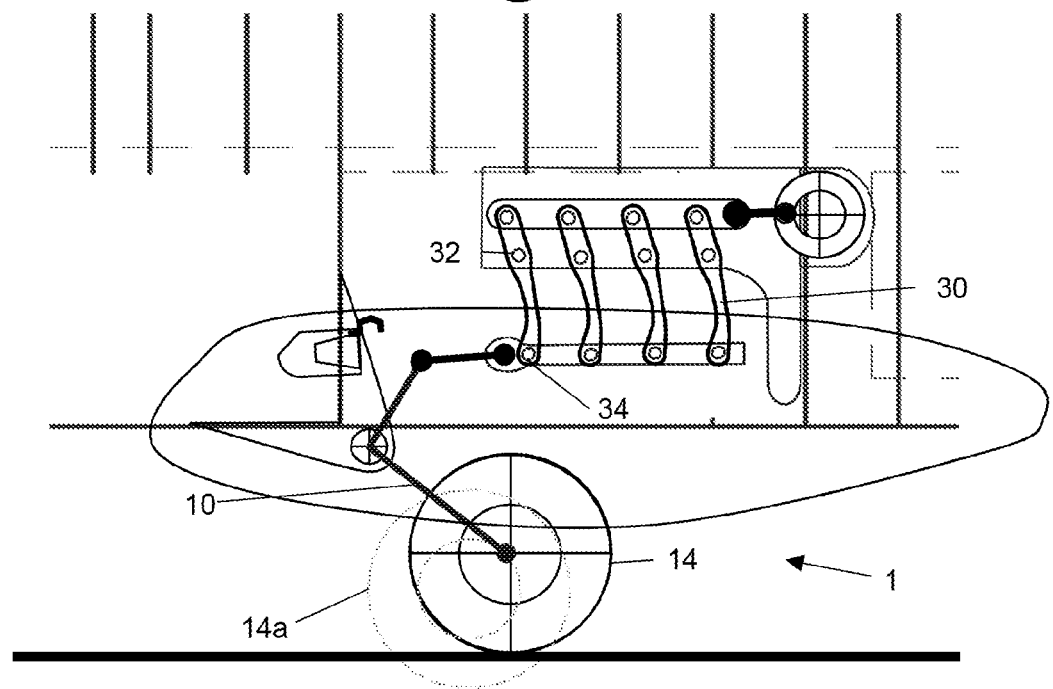
FIG. 2 shows the leaf springs absorbing ground load.
Figure 3:
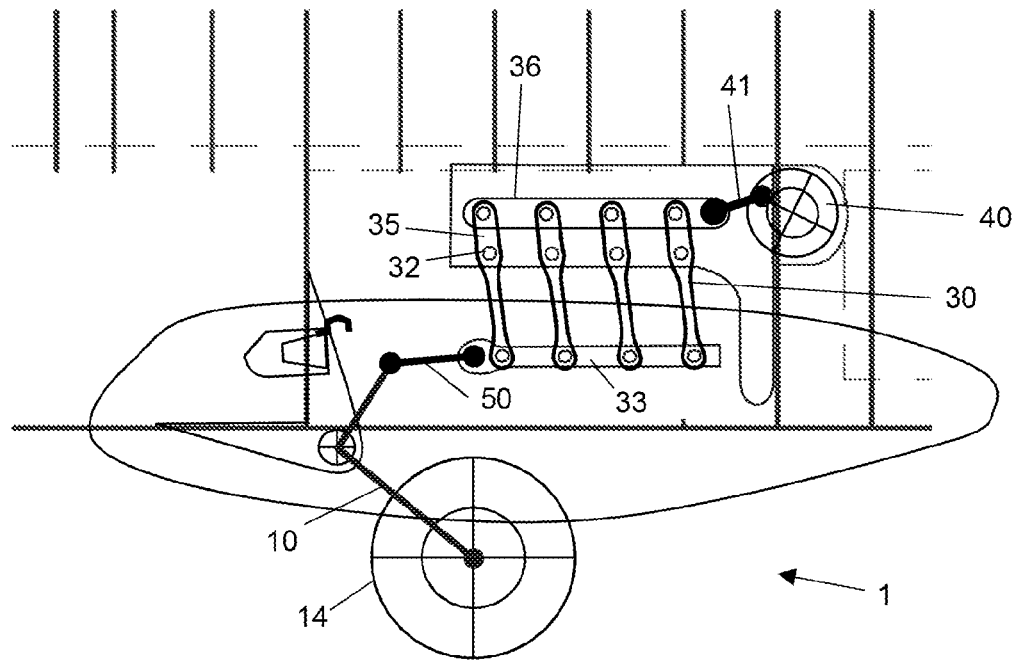
Figure 4:
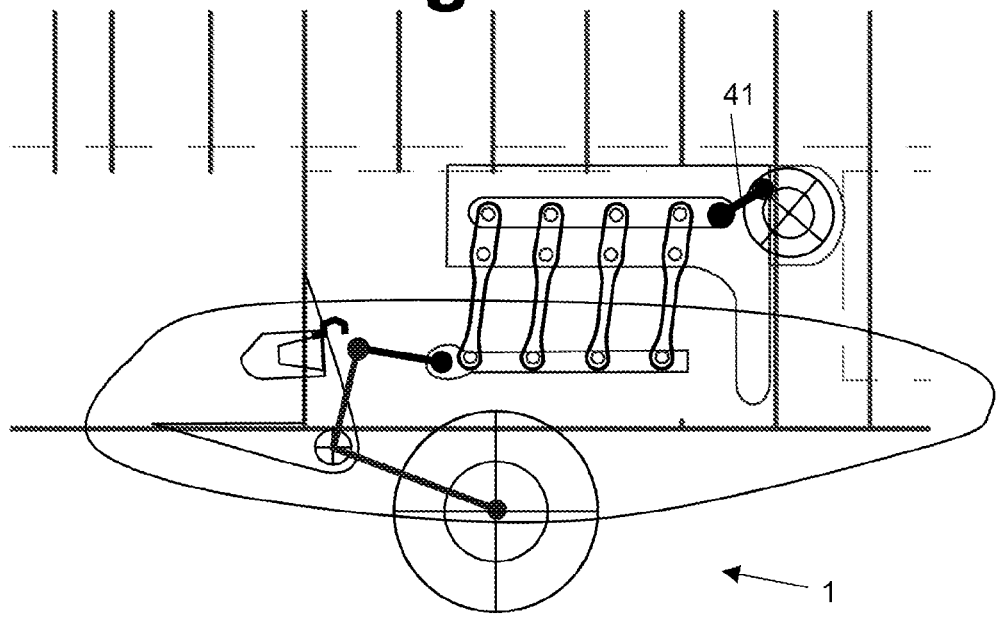
Figure 5:
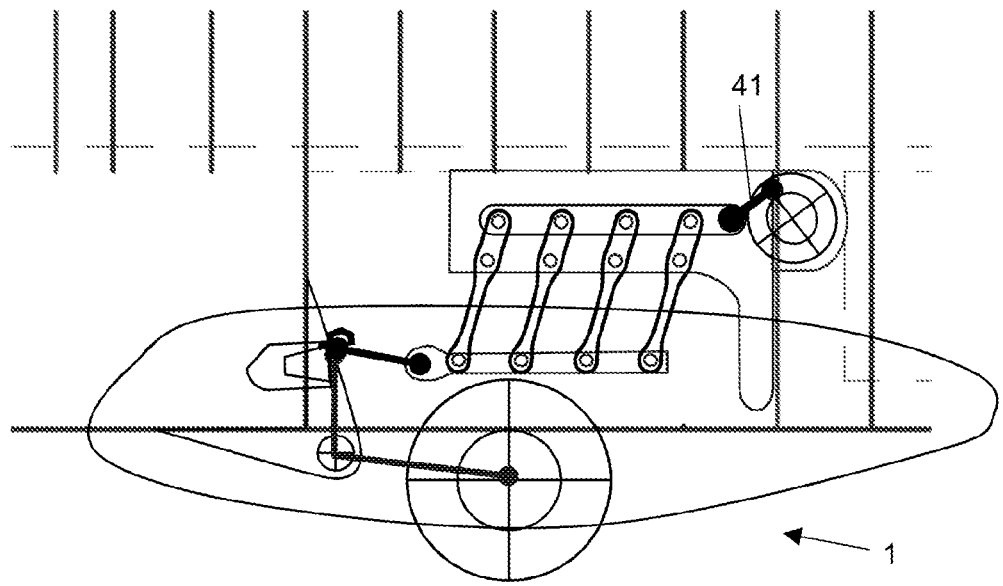
Figure 6:
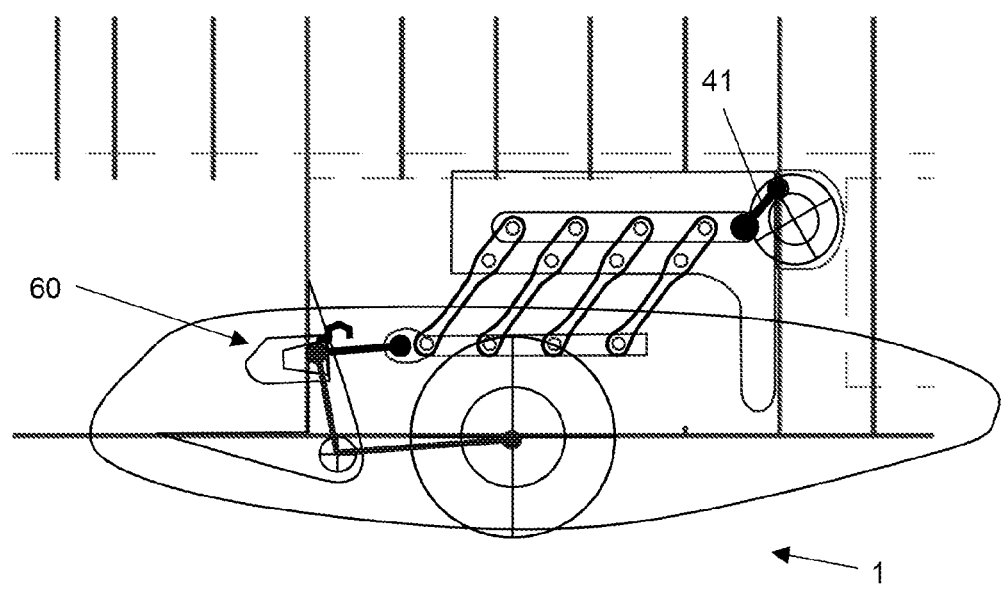

The leaf springs 30 are arranged to provide a resilient biasing force via the transfer arm 33, the crank arm 20 and the swinging link arm 50 which opposes rotation of the sprung arm 10 about the main pivot 11. FIG. 2 is a view of the landing gear as the aircraft touches down and ground load causes the sprung arm to rotate anticlockwise from the position shown in dotted lines 14a to the position shown in solid lines. The shock of this ground load causes the leaf springs 30 to bend along their lengths between the pivots 32, 34 as shown in FIG. 2, thereby absorbing the shock and providing a resilient biasing force which opposes any further rotation of the sprung arm 10.

Each leaf spring 30 only absorbs a portion of the ground load, so load and stress levels in each individual spring are lower. This enables the leaf springs to permit 500 mm of vertical axle travel for the wheel 14, and 40t of vertical load, as required by a typical single aisle aircraft.

Multiple leaf springs 30 also provides a level of redundancy, and a more distributed load into the airframe (a particular advantage for composite airframe structures).

Optionally the leaf springs 30 may have spring strengths which are different from each other, so that at least a first one of the leaf springs has a different spring strength to a second one of the leaf springs. This enables the collective spring characteristic of the leaf springs to be tuned to optimise the landing gear performance.

The retraction actuator 40 is arranged to retract the sprung arm 10 after take-off (or during maintenance when the aircraft is on jacks) by applying a retraction force to the sprung arm via the leaf springs 30 and the swinging link arm 50. This retraction force causes the sprung arm 10 to retract by rotating up about the main pivot, following the retraction sequence shown in FIGS. 3-7. As the actuator 40 rotates clockwise, the crank 41 pulls the actuation arm 36 aft (to the right) which causes the leaf springs 30 and their respective leaf spring crank arms 35 to rotate clockwise about the proximal pivots 32, and the transfer arm 33 to move forward (to the left). This causes the wheel 14 and sprung arm 10 to rotate up about the main pivot until they have reached the fully retracted position of FIG. 7. At this point, an uplock mechanism 60 is actuated to lock the swinging link arm 50 in place and prevent the sprung arm 10 from moving from this fully retracted position.

In the fully retracted position the wheel 14 extends slightly below the fuselage skin 3, so a wheel fairing 53 is provided to minimise aerodynamic drag.

The retraction sequence of FIGS. 3-7 is reversed when the landing gear is deployed during the aircraft's approach to landing. The leaf spring support 31 incorporates a part 38 which is arranged to be contacted by the transfer arm when the sprung arm has rotated down about the pivot to the fully extended position shown in FIG. 1. The part 38 acts as a stop, preventing further rotation of the sprung arm about the main pivot beyond the fully extended position as the landing gear is deployed.

In an alternative arrangement, the leaf springs 30 may be spaced apart fore and aft with the same spacing between them as the ribs 2. This enables them to be attached directly to the ribs 2, rather than being attached indirectly via the leaf spring support 31.

Figure 8A:
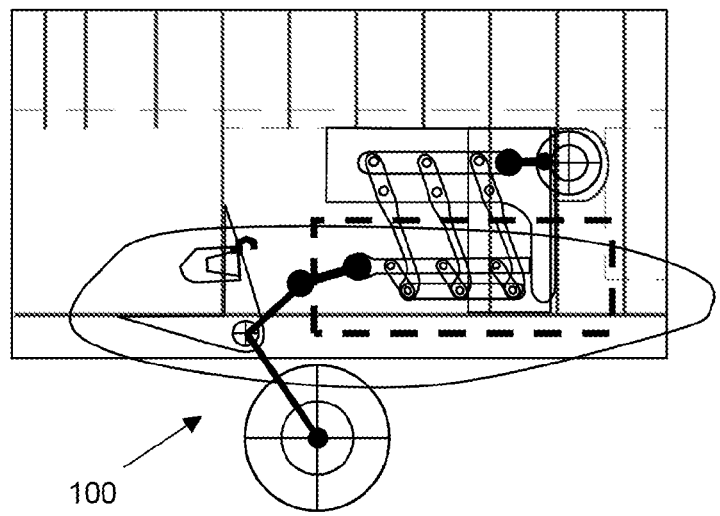
FIG. 8a shows a landing gear with dampers.
Figure 8B:
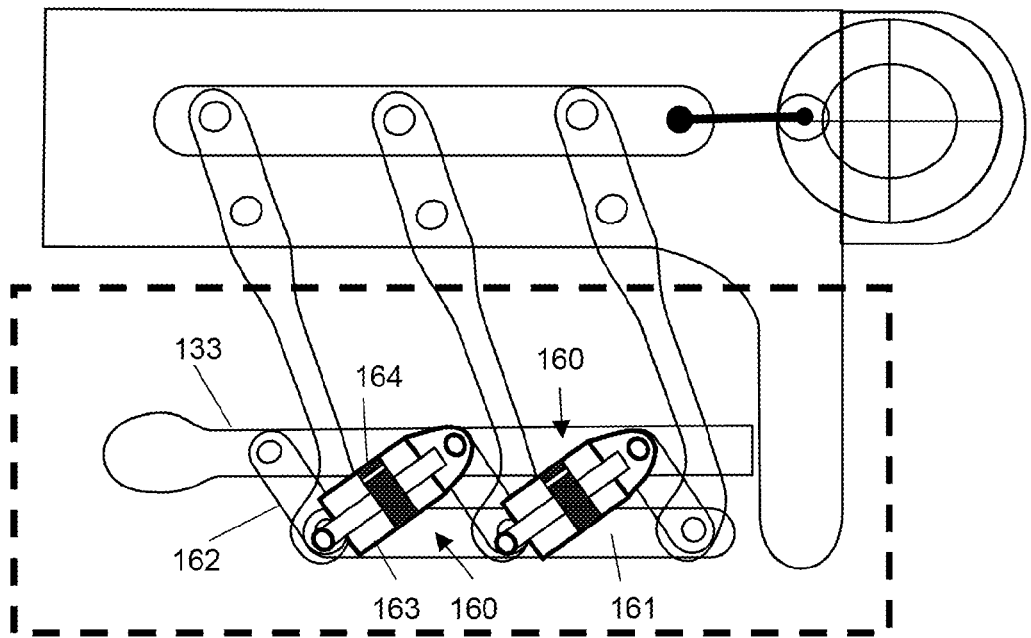

FIGS. 8a and 8b show a landing gear 100 according to a second embodiment of the invention. Many of the elements are identical to the landing gear 1, and these elements are indicated by the same number, incremented by 100, and will not be described again.

The landing gear 100 incorporates two damping devices 160 which are coupled to the transfer arm 133 via a damper bar 161 and three damper bar links 162. Each damper bar link 162 is pivotally attached to the transfer arm 133 and the damper bar 161. Each damping device 160 comprises a linear dashpot with a cylinder 163 and a piston 164. Each cylinder is pivotally attached to a respective damper bar link 162 and each piston is pivotally attached to the damper bar 161. The dampers 160 couple the sprung arm to the leaf springs, and can contract to enable the sprung arm to rotate slowly about the main pivot without the leaf springs bending.

A problem with the landing gear 1 of FIG. 1 is that in a soft landing with a very low rate of descent, the ground load does not exceed the "breakout load" which is required to force the springs 30 to bend and enable the sprung arm to rotate. Rotation of the sprung arm is taken as a "weight on wheels" signal which triggers various actions such as deployment of the aircraft's spoilers. The delay of this "weight on wheels" signal could delay these various actions. The damping devices 160 shown in FIGS. 8a and 8b provide a solution to this problem as described below.

Figure 9:
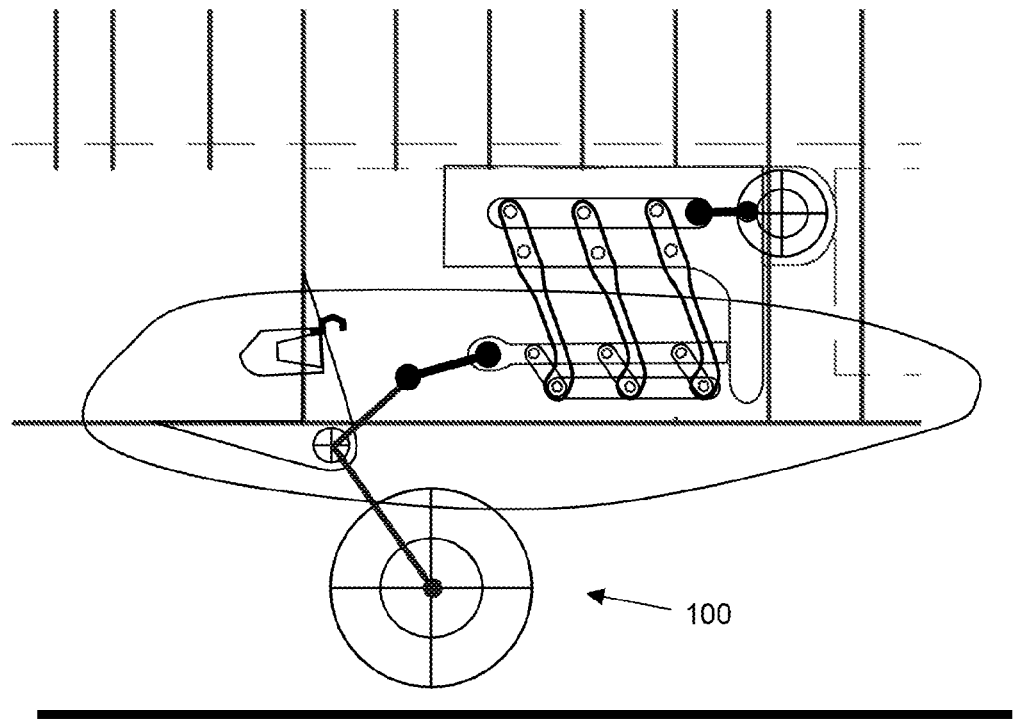
FIGS. 9 to 11 show the landing gear of FIGS. 8a and 8b absorbing ground load.
Figure 10:
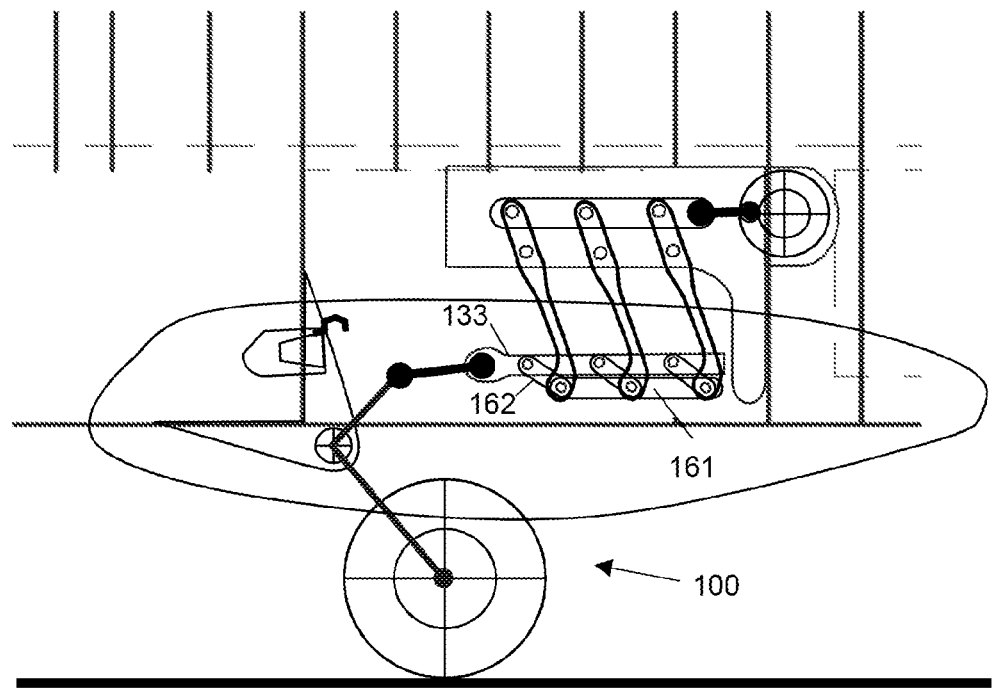
Figure 11:
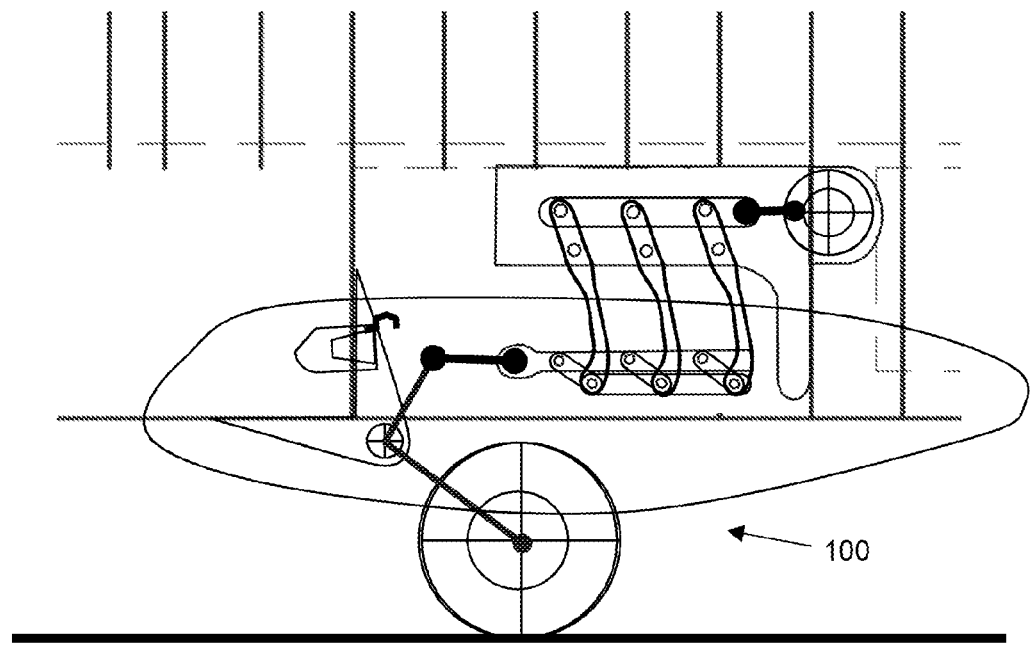

FIGS. 9-11 show the motion of the system during a soft landing. Due to the slow rate of descent during the landing the damping devices 160 are easily compressed, so they immediately compress to enable the sprung arm to rotate even if the ground load is below the breakout load of the springs. FIG. 9 shows the landing gear in its fully deployed position immediately prior to touchdown. FIG. 10 shows the initial stage touchdown load absorption, with the transfer arm 133 extended (to the left) to the extent that the damping devices 160, damper bar 161 and damper bar links 162 allow, without the leaf springs deflecting. FIG. 11 shows the leaf springs then engaged and deflected, providing the main stage resilient biasing force, as in FIG. 2.

If the landing is harder (i.e. with a faster rate of descent) then the damping devices 160 will not be compressed, and the springs 30 will flex immediately on landing to enable the sprung arm to rotate.

Figure 12:
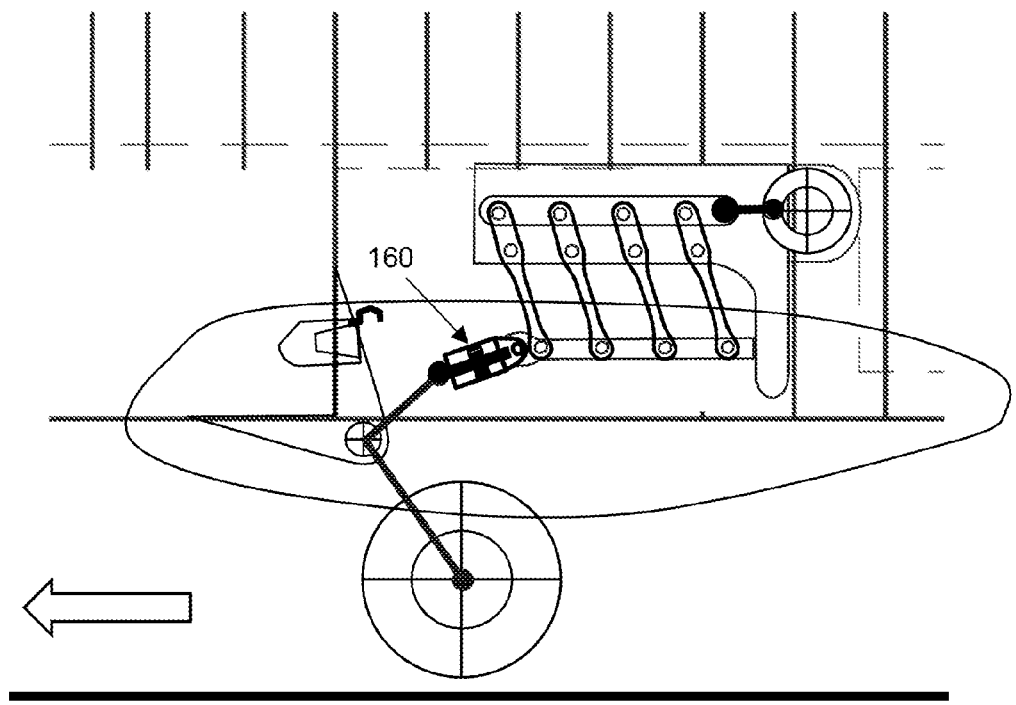
FIG. 12 shows a landing gear with a swinging link damper.

In an alternative arrangement shown in FIG. 12, a swinging link damping device 160 replaces swinging link arm 50 in the arrangement of FIG. 1. The device 160 can expand and contract to enable the first and second swinging link pivots to move towards and away from each other with a damped motion.

The swinging link damping device 160 performs the same function as the devices in FIGS. 8a and 8b. The swinging link damping device 160 couples the sprung arm to the leaf springs, and expands to enable the sprung arm to rotate slowly about the main pivot without the leaf springs bending during a soft landing.

The use of multiple leaf springs enables a number of different options for orientation and location of the springs such that their integration into the airframe can be optimised. FIGS. 13-17 show some options by way of example.

Figure 13:
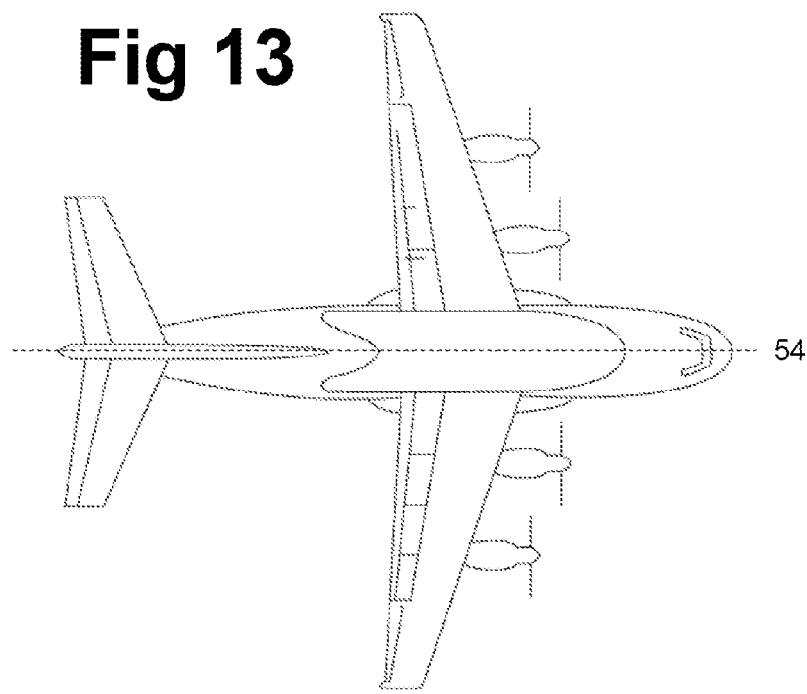
FIG. 13 is a plan view of an aircraft with the landing gear of FIG. 1.

FIG. 13 is a plan view of an aircraft incorporating the landing gear of FIG. 1. The aircraft has a plane of symmetry 54. The leaf springs 30 are arranged in a line which runs fore and aft in a leaf spring plane 55 shown in FIG. 14. This leaf spring plane 55 is vertical (parallel with the plane of symmetry 54 of the aircraft) and the various pivot axes shown in FIG. 1 are horizontal and normal to the planes 54, 55. The leaf springs 30 remain in the leaf spring plane 55 as they bend to absorb ground load, and also as they rotate to retract or deploy the landing gear. In an alternative embodiment (not shown) the leaf springs could be arranged in a left/right line (stacked in and out of the plane of FIG. 1). However this is a less compact arrangement and hence less preferred.

Figure 15:
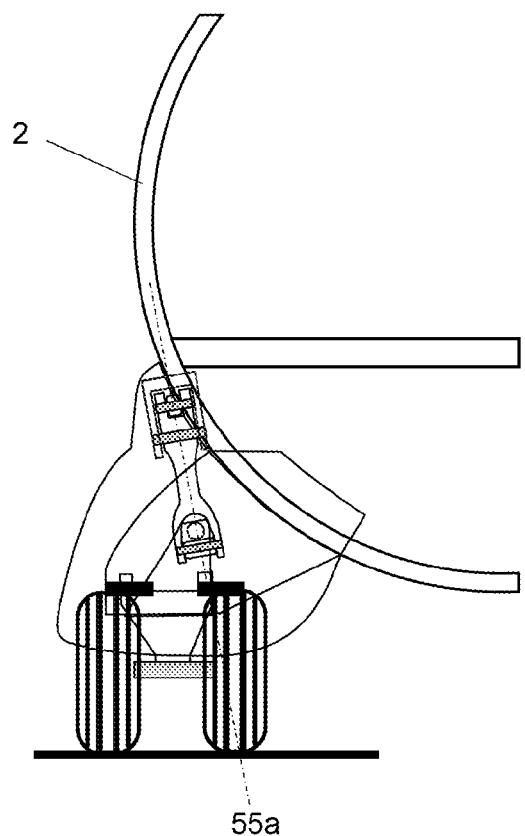
FIGS. 15 to 17 are front views of alternative arrangements for the leaf springs in the landing gear of FIG. 1.

FIG. 15 is a front view of an alternative embodiment of the invention with a leaf spring plane 55a which is canted inwards at an acute angle to the vertical so the leaf springs are more aligned with the fuselage frame.

Figure 14:
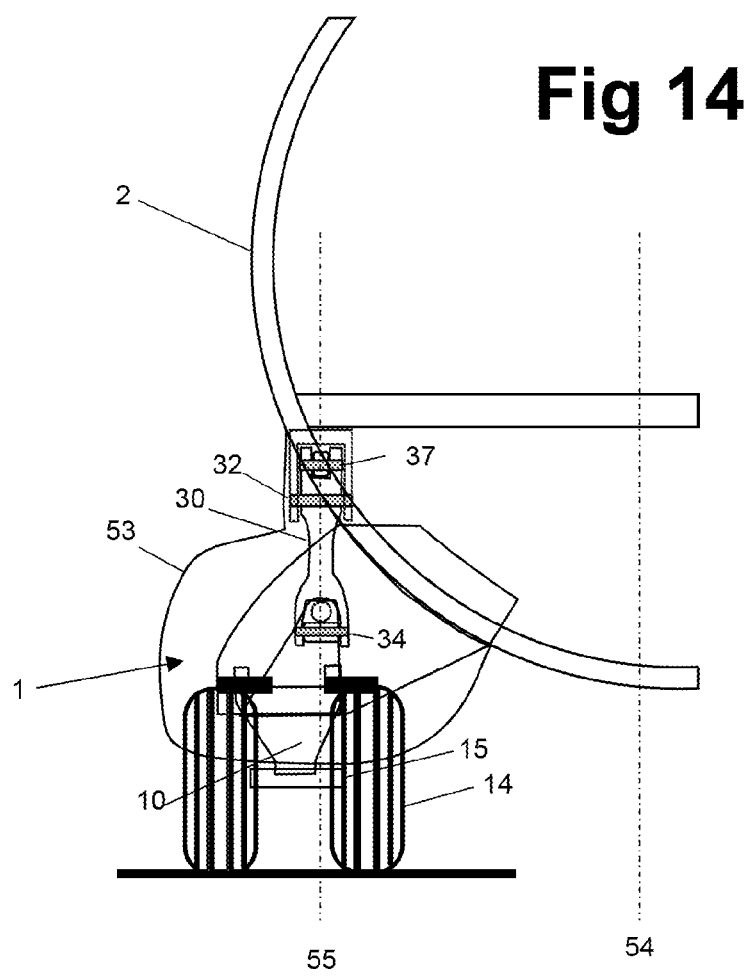
FIG. 14 is a front view of the landing gear of FIG. 1.
Figure 16:
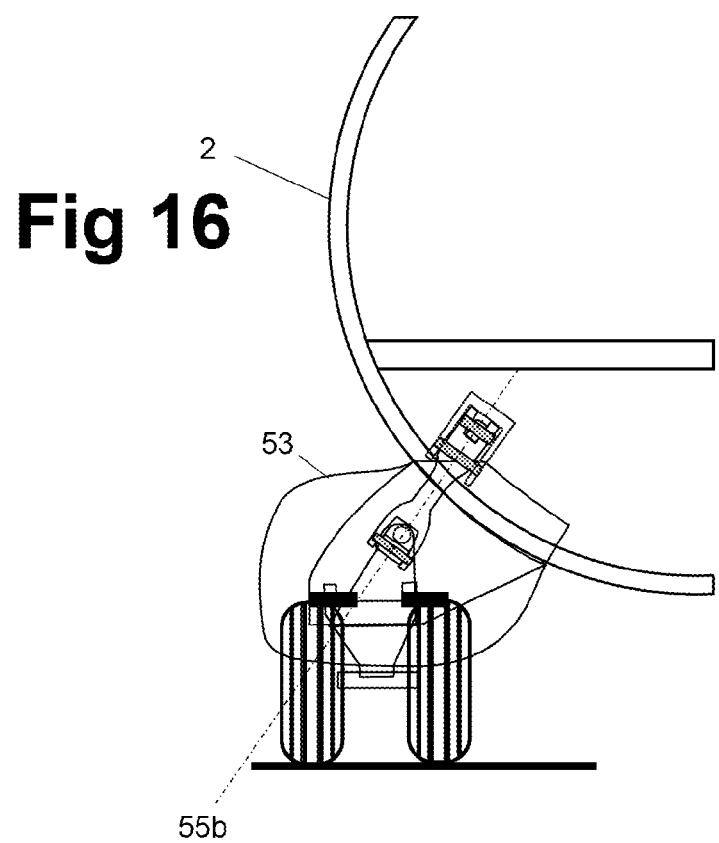

FIG. 16 is a front view of a further alternative embodiment of the invention with a leaf spring plane 55b canted outwards at an acute angle to the vertical so that the cross-section of the wheel fairing 53 is reduced compared with FIGS. 14 and 15.

Figure 17:
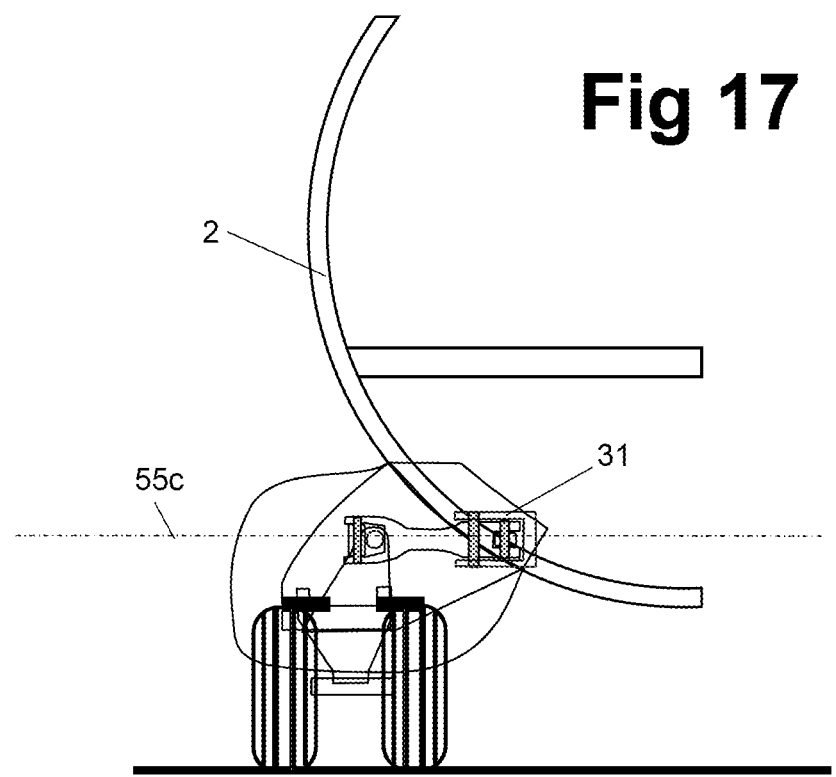
Figure 18:
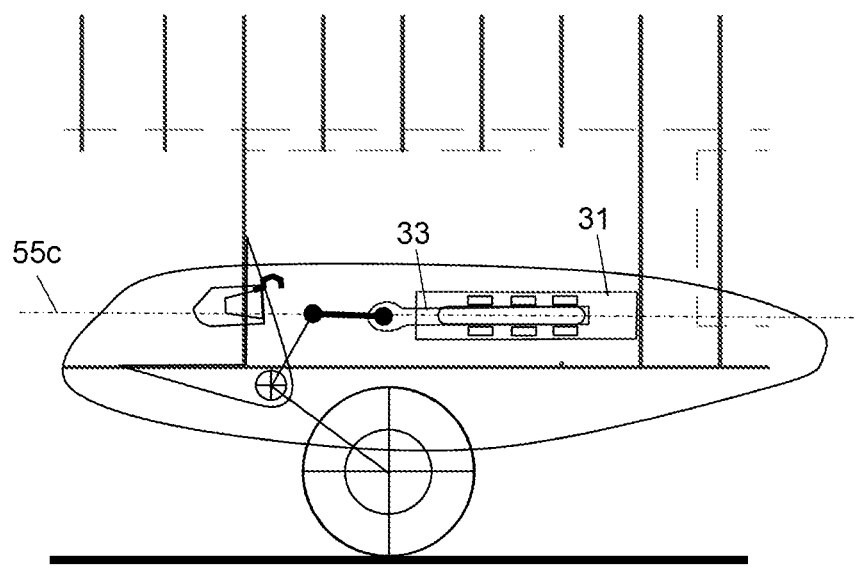
FIG. 18 is a side view of the landing gear of FIG. 17.

FIG. 17 is a front view of a further alternative embodiment of the invention with a horizontal leaf spring plane 55c. FIG. 18 is a side view of this alternative arrangement.

Figure 19:
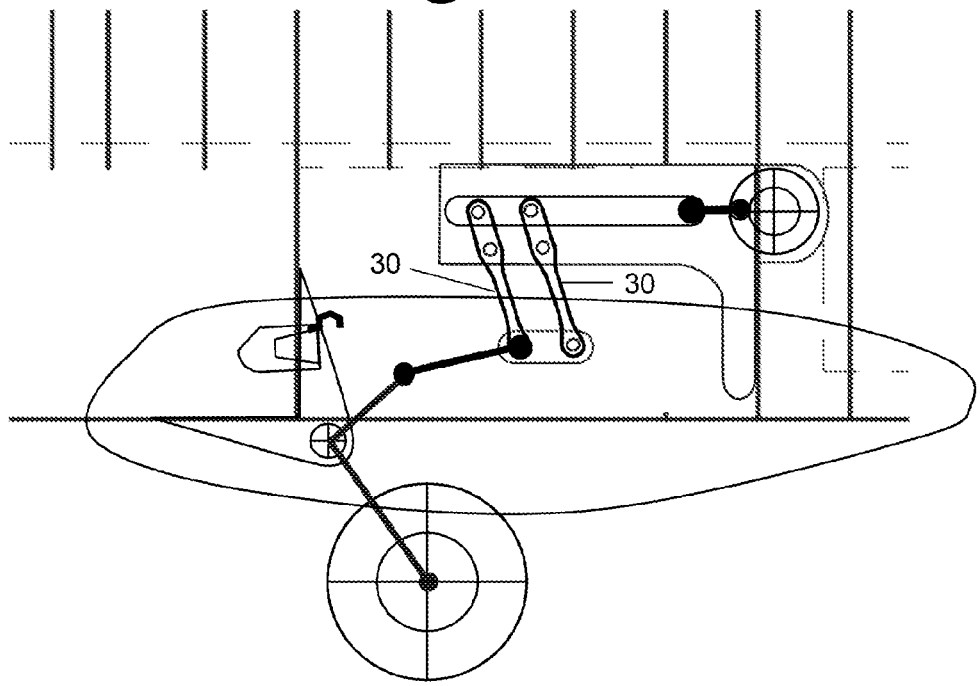
FIG. 19 is a side view of a landing gear with only two leaf springs.

The number of leaf springs may vary. The embodiments of FIGS. 1 and 8 have four and three leaf springs respectively, and the landing gear of FIG. 19 has only two leaf springs 30.

Figure 20:
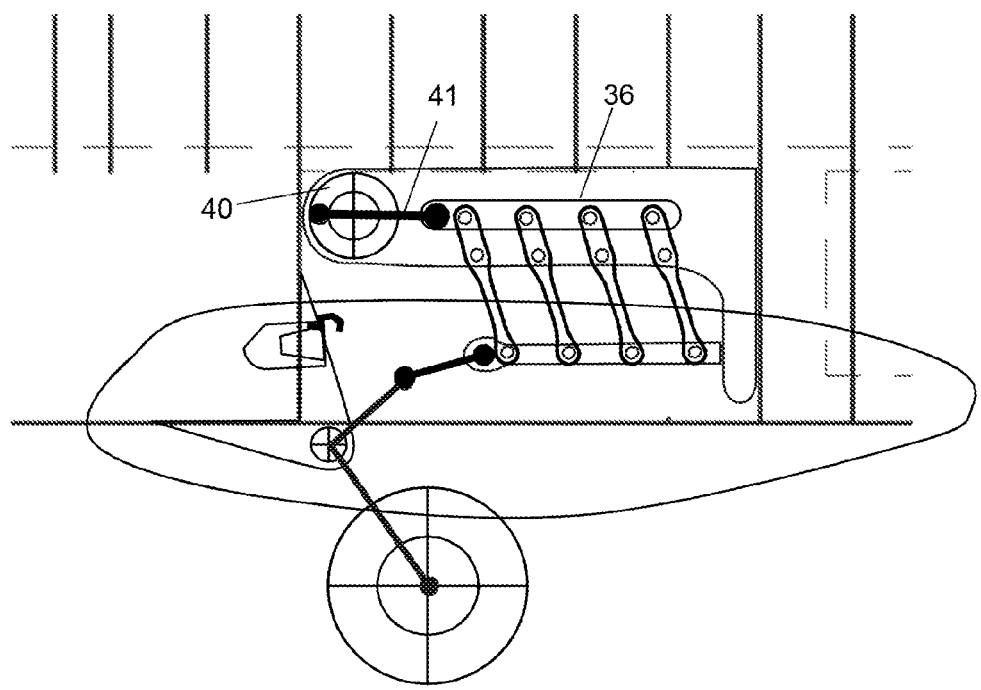
FIG. 20 is a side view of a landing gear with the actuator arranged on another side of the leaf springs.

In the embodiment of FIG. 1, the crank 41 and actuation arm 36 are in compression when they react to the ground load during landing, and in tension when they apply retraction force. In the alternative embodiment of FIG. 20, the actuator 40 and actuation arm 36 are positioned at the other end of the actuation arm 36 so that the crank 41 and actuation arm 36 are in tension when they react to the ground load during landing, and in compression when they apply the retraction force.

FIG. 21 is a side view of a wing-mounted landing gear 201 according to a further embodiment of the invention. Many of the elements have equivalents in the landing gear 1, and these elements are indicated by the same number, incremented by 200.

The sprung arm 210 of the landing gear is pivotally mounted to a distal end of a leg 231 which is pivotally mounted to an aircraft wing at pivot joints 282. The leg 231 is shown in an extended position, supported by a sidestay 281. In order to retract the landing gear 201, the leg 231 is rotated on the pivot joints 282 so it rotates up about a pivot axis 280 and is stowed within the wing. The sidestay 281 folds up as the leg is retracted.

The one-part swinging link 50 in FIG. 1 is replaced by a three-part swinging link 270-272 comprising a pair of struts 270, 272 joined by an idler link 271. The idler link 271 is pivotally attached to the leg 231 and to the struts 270, 272. The lower strut 270 is pivotally coupled to the sprung arm via a first swinging link pivot 251 and the upper strut 272 is pivotally coupled to the transfer arm 233 via a second swinging link pivot 252.

As the sprung arm 210 rotates up to the horizontal retracted position of FIG. 22, the swinging link 270-272 pushes the transfer arm 233 up, causing the springs 230 to flex. The struts 270, 272 are in compression when the springs are loaded as in FIG. 22. The three-part construction of the swinging link means that the struts 270, 272 are relatively short and can support this compressive load without buckling.

The distance between the lower strut 270 and the idler link pivot is greater than the distance between the upper strut 272 and the idler link pivot. This provides an element of mechanical advantage, so the range of motion of the strut 272 and transfer arm 233 is less than the range of motion of the strut 270.

FIG. 23 is a first variant in which the first swinging link pivot 251*a* is positioned at an intermediate point along the length of the sprung arm 210*a*, reducing the range of motion of the strut 270 compared with the embodiment of FIG. 21. This reduces the travel of the springs 230 but increases their required spring rate.

FIG. 24 is a second variant in which the idler link 271 is replaced by a bellcrank 271*a* which is pivotally attached to the leg at a pivot 290 so that when the sprung arm 210*b* moves up to the position shown in FIG. 24, the transfer arm 233 is pulled down by the bellcrank 271*a* (from the position shown in dashed lines to the position shown in solid lines) rather than being pushed up. In this embodiment the strut 272 and transfer arm 233 are in tension rather than in compression.

Figure 25:
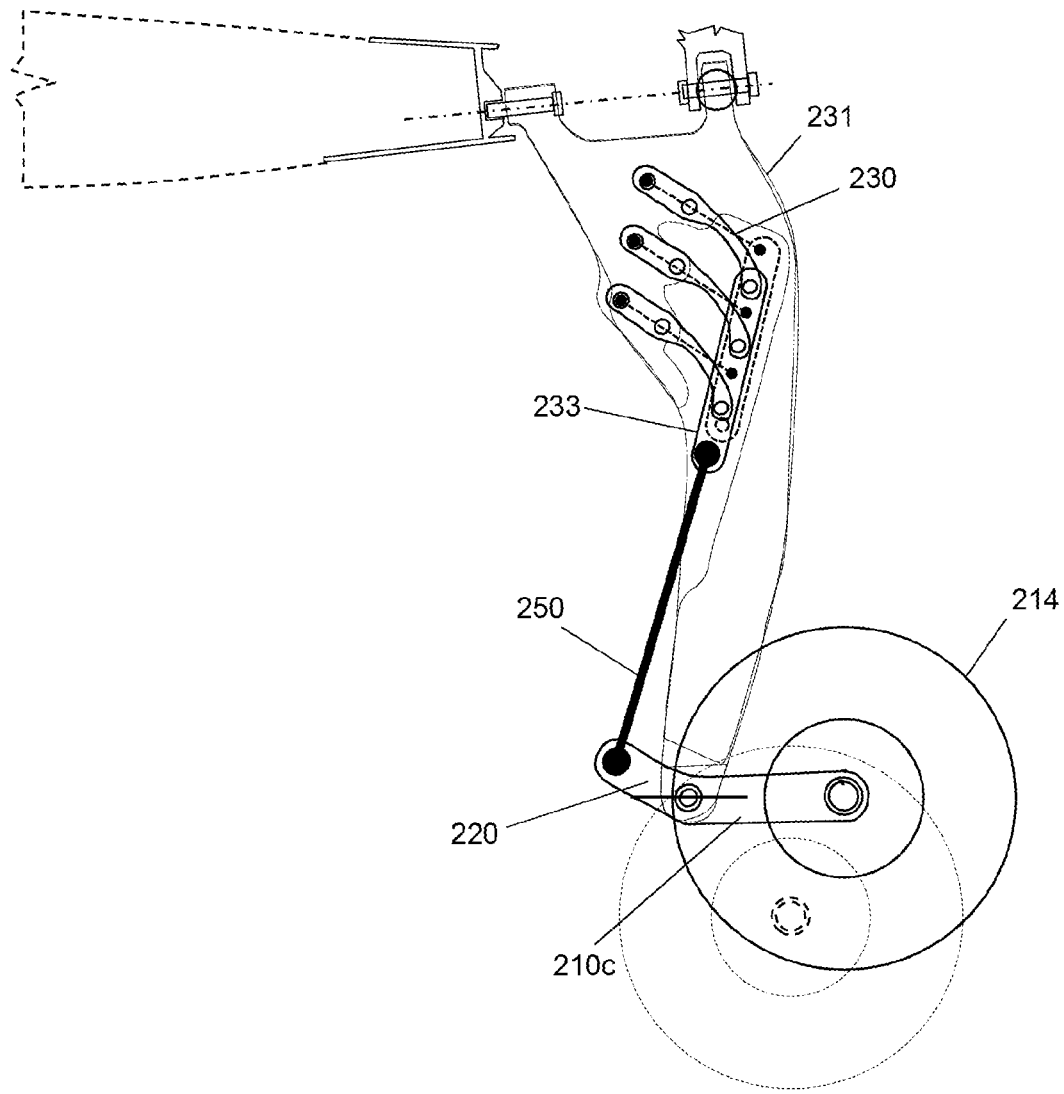
FIG. 25 is a side view of a wing-mounted aircraft landing gear with a one-part swinging link.

FIG. 25 shows a wing-mounted aircraft landing gear with a one-part swinging link member 250 equivalent to the one-part swinging link 50 in the embodiment of FIG. 1. Like the embodiment of FIG. 1, the wheel 214 is carried by a bellcrank formed by a sprung arm 210*c* and a crank arm 220.

Although none of the wing-mounted landing gears shown in FIGS. 21-25 have a damping device between the sprung arm to the leaf springs, it will be appreciated that such a damping device could be incorporated, for instance within the swinging link member 250 or the strut 270.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise.

I claim:

1. An aircraft landing gear comprising:
   a sprung arm mounted to a main pivot and carrying one or more wheels or skids;
   leaf springs;
   a transfer arm attached to each of the leaf springs;
   a swinging link with a first end pivotally coupled to the sprung arm via a first swinging link pivot and a second end pivotally coupled to the transfer arm via a second swinging link pivot, wherein the leaf springs are arranged to provide a resilient biasing force via the transfer arm and the swinging link which opposes rotation of the sprung arm about the main pivot; and
   a retraction actuator arranged to retract the sprung arm by rotating the sprung arm about the main pivot, wherein the retraction actuator is arranged to apply a retraction force to the sprung arm via the leaf springs and the swinging link which causes the sprung arm to retract by rotating about the main pivot, and wherein the leaf springs and the swinging link are arranged to rotate while the retraction force is applied to the sprung arm.

2. The aircraft landing gear according to claim 1, further comprising a crank arm coupled to the sprung arm and configured to rotate with the sprung arm about the pivot, wherein the first end of the swinging link is pivotally coupled to the sprung arm via the crank arm.

3. The aircraft landing gear according to claim 2, wherein the sprung arm and the crank arm together form a bell crank.

4. The aircraft landing gear according to claim 1, further comprising a stop arranged to be contacted by the transfer arm while the sprung arm has rotated about the pivot to a certain position, thereby preventing further rotation of the sprung arm about the pivot beyond the desired position.

5. The aircraft landing gear according to claim 1, wherein each leaf spring has a distal end which is pivotally coupled to the transfer arm via a distal pivot.

6. The aircraft landing gear according to claim 5, wherein the leaf springs are arranged in a leaf spring plane, and the distal pivots are normal to the leaf spring plane.

7. The aircraft landing gear according to claim 1, wherein the leaf springs comprise three or more leaf springs each pivotally coupled to the transfer arm via a respective distal pivot, wherein the three or more distal pivots are arranged in a straight line.

8. The aircraft landing gear according to claim 1, wherein the leaf springs are arranged in a leaf spring plane and remain in the leaf spring plane as the leaf springs bend to provide the resilient biasing force.

9. The aircraft landing gear according to claim 1, wherein a first one of the leaf springs has a different spring strength to a second one of the leaf springs.

10. The aircraft landing gear according to claim 1, further comprising a damping device coupling the sprung arm to the leaf springs.

11. The aircraft landing gear according to claim 1, wherein the swinging link comprises a damping device which enables the first and second swinging link pivots to move towards and away from each other with a damped motion.

12. An aircraft landing gear comprising:
    a sprung arm mounted to a main pivot and carrying one or more wheels or skids;
    leaf springs;
    a transfer arm attached to each of the leaf springs, wherein each leaf spring has a distal end which is pivotally coupled to the transfer arm via a distal pivot; and a swinging link with a first end pivotally coupled to the sprung arm via a first swinging link pivot and a second end pivotally coupled to the transfer arm via a second swinging link pivot, wherein the leaf springs are arranged to provide a resilient biasing force via the transfer arm and the swinging link which opposes rotation of the sprung arm about the main pivot a leaf spring support, wherein each of the leaf springs has a proximal end which is pivotally coupled to the leaf spring support via a proximal pivot;

leaf spring crank arms each coupled to a respective one of the leaf springs so that the leaf spring crank arm coupled to the leaf spring rotates along with the leaf spring about the proximal pivot;

an actuation arm pivotally coupled to the leaf spring crank arms; and a retraction actuator arranged to move the actuation arm thereby causing the leaf springs to rotate about respective proximal pivots of the leaf springs, and to cause the sprung arm to retract by rotating about the main pivot.

13. The aircraft landing gear according to claim 12, further comprising an uplock mechanism arranged to prevent the sprung arm from moving after the sprung arm has been fully retracted by the retraction actuator.

14. The aircraft landing gear according to claim 12, wherein the leaf springs are arranged in a leaf spring plane, and the proximal pivots are normal to the leaf spring plane.

15. An aircraft landing gear comprising:
a sprung arm mounted to a main pivot and carrying one or more wheels or skids;
leaf springs;
a transfer arm attached to each of the leaf springs;
a swinging link with a first end pivotally coupled to the sprung arm via a first swinging link pivot and a second end pivotally coupled to the transfer arm via a second swinging link pivot, wherein the leaf springs are arranged to provide a resilient biasing force via the transfer arm and the swinging link which opposes rotation of the sprung arm about the main pivot;
wherein the main pivot is the mounting point for the sprung arm to a support, and;
the swinging link comprises a pair of outer links joined by an intermediate link which is pivotally attached to the support and to the pair of outer links.

16. An aircraft landing gear comprising:
a sprung arm mounted to a main pivot and carrying a wheel or skid;
leaf springs;
a transfer arm attached to each of the leaf springs;
a swinging link including a first end pivotally coupled to the sprung arm via a first swinging link pivot and a second end pivotally coupled to the transfer arm via a second swinging link pivot, wherein the leaf springs apply a resilient biasing force opposing rotation of the sprung arm about the main pivot, and
a retraction actuator configured to apply a retraction force which rotates the sprung arm about the main pivot to a retracted position, wherein the retraction force is applied by the retraction actuator to the sprung arm via the leaf springs and the swinging link which rotate in response to the retraction force.

* * * * *